United States Patent [19]

Ardemagni

[11] 4,072,735
[45] Feb. 7, 1978

[54] HOT MELT PRESSURE SENSITIVE ADHESIVES

[75] Inventor: Loyce A. Ardemagni, Longview, Tex.

[73] Assignee: Eastman Kodak Company, Rochester, N.Y.

[21] Appl. No.: 692,404

[22] Filed: June 3, 1976

[51] Int. Cl.² ............................................. C08L 23/16
[52] U.S. Cl. .............................. 260/897 A; 260/27 R; 260/27 BB; 260/889
[58] Field of Search .................................. 260/897, 27

[56] References Cited

U.S. PATENT DOCUMENTS

| | | | |
|---|---|---|---|
| 3,492,372 | 1/1970 | Flanagan | 260/897 |
| 3,514,417 | 5/1970 | Bickel et al. | 260/27 |

Primary Examiner—Carman J. Seccuro
Attorney, Agent, or Firm—Clyde L. Tootle; Daniel B. Reece, III

[57] ABSTRACT

The hot melt pressure sensitive adhesives of the present invention comprise a blend of ethylene-propylene rubber, tackifying resin, and polybutene. The hot melt adhesive blend may also contain crystalline polypropylene. This hot melt pressure sensitive adhesive has a novel combination of properties including good resistance to plasticizer migration and good heat stability.

9 Claims, No Drawings

HOT MELT PRESSURE SENSITIVE ADHESIVES

This invention relates to hot melt pressure sensitive adhesive compositions having a novel combination of properties. More specifically, the invention relates to hot melt pressure sensitive adhesive compositions having a novel combination of properties including good resistance to plasticizer migration and good heat stability.

Pressure sensitive adhesives that have good tack and adhere to numerous substrates are widely used by industry in various applications such as in consumer products. For example, one such application is in the construction of floor tiles having a preapplied adhesive for the do-it-yourself market. In this application the pressure sensitive adhesive is thinly coated onto the undersurface of floor tiles and covered with a protective release sheet. Installation of the floor tiles is accomplished by removing the release sheet and pressing the tile into place. The pressure sensitive adhesives presently used in this type application contain either a styrene-butadiene rubber or a styrene-isoprene rubber. Although these pressure sensitive adhesives provide adequate adhesive properties, they have certain deficiencies that limit their usefulness. These adhesives have poor resistance to plasticizer migration and consequently in applications such as use on floor tiles allow the plasticizer in the tile to migrate into the adhesive thereby causing the adhesive to soften and string excessively. These prior adhesives also have poor heat stability as evidenced by an excessive change in viscosity when exposed to a temperature of 350° F. (the application temperature) for 24 hours. Another disadvantage of these prior adhesives is that they are expensive to produce because of the large amounts of rubber required in the composition to obtain adequate adhesive properties. Therefore, it would be an advance in the state of the art to have a hot melt pressure sensitive adhesive that has good adhesive properties without the disadvantages associated with prior pressure sensitive adhesives.

In accordance with the present invention, I have found that a blend comprising ethylene-propylene rubber, tackifying resin, polybutene, and optionally a crystalline polypropylene, provides a hot melt pressure sensitive adhesive having a novel combination of properties including good resistance to plasticizer migration and good heat stability.

The ethylene-propylene rubbers useful in the present invention are well-known materials and can be prepared by copolymerizing ethylene and propylene. Small amounts of a third monomer, such as a nonconjugated diene, can be added to provide unsaturation. The polymerization is usually carried out at a temperature below 100° C. using a coordination catalyst such as one comprised of aluminum alkyls and alkyl aluminum chloride and vanadium oxychloride. These ethylene-propylene rubbers contain 0 to 5 mole percent unsaturation, have an ethylene content of 50 to 90 weight percent, preferably 65 to 80 weight percent, and have a flow rate at 230° C. of about 0.2 to 0.8, preferably about 0.4 to about 0.6. An example of one such commercially available ethylene-propylene rubber useful in the present invention is Vistalon 702 rubber available from Exxon Chemicals. These rubbers can be used alone or in combinations in amounts of about 5 percent to about 15 percent by weight of the adhesive composition, preferably about 8 percent to about 12 percent by weight.

The tackifying resins useful in the adhesive compositions of this invention can be a hydrocarbon resin such as DAC-B hydrocarbon resin prepared according to the process disclosed in U.S. Pat. No. 3,701,760 as well as other hydrocarbon resins, synthetic polyterpenes, rosin esters and the like. One such hydrocarbon tackifying resin is a hydrocarbon resin having a softening point of 100° C. and available commercially as Resin H-100 from Eastman Chemical Products, Inc. Other hydrocarbon tackifying resins can be prepared by the polymerization of monomers consisting primarily of olefins and diolefins and include, for example, the residual by-product monomers resulting from the manufacture of isoprene. These hydrocarbon tackifying resins typically exhibit a ring and ball softening point of from about 80° C. to 125° C.; an acid number of from about 0-2; a saponification value of less than about 1; and, an iodine value of from about 75 to 100. Examples of such commercially available resins of this type are "Wingtack" 95 as sold by the Goodyear Tire and Rubber Company and the Sta-Tac and Betaprene H resins sold by the Reichhold Chemical Corporation.

Also other suitable resins are the terpene polymers such as the polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, turpentine, a terpene cut or fraction, and various other terpenes. Particularly useful starting materials are terpene mixtures containing at least 20 percent beta-pinene and/or limonene or dipentene (racemic limonene), and the "sulfate turpentine" obtained as a by-product in the sulfate pulping process. Other suitable tackifying resins are the rosin esters which include ethylene glycol, polyethylene glycol, glycerol and pentaerythritol rosin esters, hydrogenated rosin esters or methylated rosin esters, for example, the commercially available materials "Staybelite" Ester 3, triethylene glycol ester of hydrogenated rosin, "Foral" 85 and 105, highly stabilized ester resins of pentaerythritol and rosin base.

The hydrocarbon resins, polyterpenes, and rosin esters can be used either alone or in combinations; however, in general, the better results have been obtained with the hydrocarbon resins used alone. These tackifying resins can be used in amounts of about 30 percent to about 60 percent by weight of the adhesive composition, preferably about 45 percent to about 55 percent by weight.

The polybutenes useful in the adhesive compositions of this invention are butylene polymers composed predominantly of monoolefins having four carbon atoms (85 percent to 98 percent by weight), the balance being isoparaffins. The molecular weight of the polybutene should be in the range of about 300 to 3,000 (as determined by Microlab Osmometer), preferably about 600 to 1,500. Such polymers which are particularly useful in the invention, and commercially available under the trade name "Indopol" are available from Amoco Chemicals, such as for example, Indopol H-100 polymers. These polybutylenes can be used alone or in combinations in amounts of about 20 percent to 50 percent by weight of the adhesive composition, preferably about 35 percent to about 40 percent by weight.

The crystalline, hexane insoluble polypropylenes useful as an optional component in the adhesive compositions of this invention are produced by the polymerization of propylene in the presence of stereospecific catalysts. One method for preparing these polypropylenees is disclosed in U.S. Pat. No. 3,679,775. These polypropylenes are predominantly crystalline, i.e., hexane insoluble; however, they may contain a small amount of amorphous polypropylene, i.e., hexane soluble in an amount up to about 10 percent by weight of the polypropylene component. These polypropylenes have inherent viscosities (I.V.) as measured in tetralin at 145° C. of from about 0.5 to 4.0, preferably about 1.0 to 3.0. These crystalline polypropylenes can be used in amounts of about 1.0 percent to about 5.0 percent by weight of the adhesive composition, preferably about 2.0 percent to about 4.0 percent by weight.

The adhesive compositions of this invention are prepared by blending together the components in the melt as a temperature of about 160° C. to about 200° C. until a homogeneous blend is obtained. Various methods of blending materials of this type are known to the art and any method that produces a homogeneous blend is satisfactory. These components blend easily in the melt and a heated vessel equipped with a stirrer is all that is required. For example, a Cowles stirrer provides an effective mixing means for preparing these hot melt pressure sensitive adhesive compositions.

In addition to the above listed components, it is desirable for the hot melt pressure sensitive adhesive composition to contain about 0.1 to about 1.5 percent by weight, preferably about 0.25 percent to 1.0 percent by weight, of one or more stabilizers or antioxidants. Antioxidants that are effective for each of the various components can be used. Such antioxidants include, for example, "Ionox" 220 and 330 [tris(di-t-butyl-p-hydroxybenzyl)-trimethylbenzene], "Dalpac" 4C2 [6- di(t-butyl)-p-cresol], "Naugawhite" (alkylated bisphenol), "Butyl Zimate" (zinc dibutyl dithiocarbamate), and "Ethyl" 702 [4,4'-methylene bis(2,6-di-tert-butylphenol)]. A particularly effective antioxidant is Irganox 1010 which is identified as tetrakis[methylene-3-(3',5'-di-t-butyl-4'-hydroxyphenyl)propionate]methane.

There are numerous uses for the pressure sensitive adhesives of the present invention. One such use is in the construction of women's sanitary napkins. A strip of the pressure sensitive adhesive is applied to the polyethylene shield of the napkin and then protected by a release sheet. At the time of use, the release sheet is removed and the napkin is held in place by adhering the pressure sensitive adhesive to the undergarment, thus eliminating the need for belts and pins. Removal of the napkin is quick as it strips cleanly from the garment.

Another use of the adhesives of this invention is in the construction of floor tiles having a preapplied adhesive for the do-it-yourself market. The pressure sensitive adhesive is thinly coated onto the undersurace of such floor tiles and covered with a protective release sheet. Quick and permanent installation of the floor tiles is accomplished by removing the release sheet and pressing the tile into place. This technique of installing floor tiles can be extended to other types of coverings such as wall tiles and ceiling tiles.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

The following adhesive composition was prepared:

| | |
|---|---|
| 50 Percent | DAC-B Hydrocarbon Resin. Hydrocarbon Resin having a Softening Point 100° C. and a viscosity of 140 centipoise at 190° C. (Resin H-100) |
| 10 Percent | Ethylene-Propylene Rubber. 70 Weight Percent Ethylene. 0.5 Flow Rate at 230° C. (Vistalon 702 Rubber) |
| 39.75 Percent | Polybutene. Molecular Weight 920 and a melt viscosity of 215 centistokes at 210° F. (Indopol H-100) |
| 0.25 Percent | Irganox 1010 Tetrakis[methylene-3-(3',5'-di-t-butyl-4'-hydroxyphenyl)propionate]-methane |

This composition provided an adhesive composition with the following properties:

| | |
|---|---|
| Viscosity at 350° F. (177° C.), cp | 20,000 |
| Ring and Ball Softening Point, ° C. | 85 |
| 180° Peel Adhesion, lb./in. | 3.0 |
| Quick Stick, lb./in. | 1.4 |
| Shear Adhesion, Minutes to Failure at 73° F., 1,000 gram load, 1 in.² bond area | 1,200 |

This adhesive has good pressure sensitive adhesive properties and good aggressive tack. It shows good peel adhesion and quick stick values. This adhesive composition was also melt coated onto floor tiles and exhibited good adhesion to the vinyl asbestos tile. Adhering the coated tiles to various substrates (wood, concrete. other tiles, and the like) resulted in destruction of the tile when removal was attempted. The adhesive maintained these properties after coated tiles had aged for two months at 140° F. This adhesive also exhibited good adhesion to other substrates such as polyethylene, Kraft paper, various fabrics and cloths. The compositions also showed good resistance to thermal degradation and oxidation (less than 10 percent viscosity change after 24 hours at 350° F.).

EXAMPLE 2

The following adhesive composition was prepared:

| | |
|---|---|
| 50 Percent | Resin H-100 |
| 8 Percent | Vistalon 702 Rubber |
| 3 Percent | Crystalline Polypropylene, having an I.V. of 0.8 and a flow rate of 90 at 230° C. |
| 38.75 Percent | Indopol H-100 |
| 0.25 Percent | Irganox 1010 |

This composition provided an adhesive with the following properties:

| | |
|---|---|
| Viscosity at 350° F. (177° C.), cp | 8,000 |
| Ring and Ball softening Point, ° C. | 120 |
| 180° Peel Adhesion, lb./in. | 4.0 |
| Quick Stick, lb./in. | 1.0 |
| Shear Adhesion, Minutes to Failure at 73° F., 1,000 gram load, 1 in.² bond area | 3,500 |

This adhesive also shows good aggressive tack and good adhesive properties. The addition of the crystalline polypropylene (Tenite 428S) has increased the ring and ball softening point of the adhesive which decreases its tendency to soften and creep at elevated temperatures. Floor tiles coated with this adhesive were stacked and placed under a load of 2 psi and stored at 140° F. for two months. No evidence of flowing of the adhesive was observed whereas the adhesive in Example 1 showed some indication of flow. Another indication of the improvement in creep resistance is the improvement in shear adhesion shown by Example 2 over Example 1.

EXAMPLE 3

The following adhesive compositions were prepared:

| Component | Composition of This Invention A | Prior Composition B | Prior Composition C |
|---|---|---|---|
| DAC-B Hydrocarbon Resin (Resin H-100), % | 50 | 50 | 50 |
| Ethylene-Propylene Rubber (Vistalon 702), % | 10 | | |
| Styrene-Butadiene Rubber (Solprene 417), % | | 30 | |
| Styrene-Isoprene Rubber (Kraton 1107), % | | | 30 |
| Polybutene (Indopol H-100), % | 39.75 | 19.75 | 19.75 |
| Irganox 1010% | 0.25 | 0.25 | 0.25 |
| Viscosity at 350° F., cp | 20,000 | 30,000 | 18,000 |
| Ring and Ball Softening Point, ° C. | 85 | 85 | 100 |
| 180° Peel Adhesion, lb./in. | 3.0 | 2.8 | 2.9 |
| Heat Stability, % viscosity change after aging 24 hours at 350° F. | 10 | 25 | 25 |

The three adhesives have good surface tack and comparable adhesive properties. However, the adhesive of this invention has a substantially better heat stability. Also the adhesive of this invention requires only about one-third as much rubber as does the prior compositions. The use of ethylene-propylene rubber also provides two economic advantages:
1. It is lower in cost than the styrene-butadiene rubber or styrene-isoprene rubber.
2. Since less rubber is required in the compositions of this invention a larger percentage of the polybutene, which is much lower in cost than the rubbers, is incorporated into the adhesive composition.

EXAMPLE 4

The plasticizer migration resistance of the adhesive of Example 2 was compared with that of a commercial adhesive presently used for floor tile applications. The comparison was made by coating vinyl floor tiles with each adhesive and then aging the tiles at 120° F. and 140° F. for four weeks. The tiles were tested weekly for tough tack. Softening or stringing of the adhesive on the tiles indicated plasticizer migration. Results are as follows.

| | Commercial Adhesive (Boler P-1324) | Adhesive of Example 2 |
|---|---|---|
| Plasticizer Migration Resistance | After one week at 120° F. and 140° F. the adhesive had softened and stringed excessively. | No softening or stringing after four weeks at 120° C.; slight softening after four weeks at 140° F. |

As can be seen from the above data, the composition of this invention has much better plasticizer migration resistance than the commercial adhesive. The commercial adhesive contains a styrene-isoprene rubber based on infrared analysis of the adhesive composition.

EXAMPLE 5

The following adhesive composition was prepared:
- 50 Percent Resin H-100
- 15 Percent Vistalon 702
- 3 Percent Crystalline Polypropylene (I.V. 0.8)
- 31.75 Percent Indopol H-100
- 0.25 Percent Irganox 1010

This composition had the following properties:
- Viscosity at 350° F., cp   250,000
- Ring and Ball Softening Point, ° C.   130

This adhesive composition had good surface tack and cohesive strength. However, due to its high viscosity its utility would be limited because of application equipment limitations. Therefore, the maximum level for the ethylene-propylene rubber in the compositions of this invention should be about 15 weight percent.

Although the invention has been described in considerable detail with particular reference to certain preferred embodiments thereof, variations and modifications can be effected within the spirit and scope of the invention.

I claim:
1. An adhesive composition capable of being used as a hot melt pressure sensitive adhesive comprising a blend of
   1. 5 to 15 weight percent ethylene-propylene rubber,
   2. 30 to 60 weight percent of at least one tackifying resin selected from the group consisting of hydrocarbon tackifier resins, polyterpene resins, and rosin esters, and
   3. 20 to 50 weight percent polybutylene.
2. An adhesive composition according to claim 1 wherein said ethylene-propylene rubber has an ethylene content of from 50 to 90 weight percent, contains 0 to 5 mole percent unsaturation, and has a flow rate at 230° C. of about 0.2 to about 0.8.
3. An adhesive composition according to claim 2 wherein said tackifying resin is hydrocarbon resin.
4. An adhesive composition according to claim 3 wherein said polybutylene are polymers having a molecular weight of from 300 to 3,000 and are composed predominantly of monoolefins having four carbon atoms (85 to 98 percent by weight), the remainder being isoparaffins.
5. An adhesive composition capable of being used as a hot melt pressure sensitive adhesive comprising a blend of
   1. 5 to 15 weight percent ethylene-propylene rubber,
   2. 30 to 60 weight percent of at least one tackifying resin selected from the group consisting of hydrocarbon tackifier resins, polyterpene resins, and rosin esters,
   3. 20 to 50 weight percent polybutylene, and
   4. 1 to 5 weight percent crystalline polypropylene.
6. An adhesive composition according to claim 5 wherein said ethylene-propylene rubber has an ethylene content of from 50 to 90 weight percent, contains 0 to 5 mole percent unsaturation, and has a flow rate at 230° C. of about 0.2 to about 0.8.
7. An adhesive composition according to claim 6 wherein said tackifying resin is hydrocarbon resin.
8. An adhesive composition according to claim 7 wherein said polybutylene are polymers having a molecular weight of from 300 to 3,000 and are composed predominantly of monoolefins having 4 carbon atoms (85 to 98 percent by weight) the remainder being isoparaffins.
9. An adhesive composition according to claim 8 wherein said crystalline polypropylene has an inherent viscosity as measured in tetralin at 145° C. of 0.5 to 4.0.

* * * * *